(12) United States Patent
Fisher et al.

(10) Patent No.: US 7,536,501 B2
(45) Date of Patent: May 19, 2009

(54) APPARATUS AND METHOD TO MANAGE ONE OR MORE RESERVED VOLUME SERIAL NUMBERS IN A VIRTUAL LIBRARY GRID

(75) Inventors: James Arthur Fisher, Tucson, AZ (US); Mark Albert Reid, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/464,255

(22) Filed: Aug. 14, 2006

(65) Prior Publication Data
US 2008/0040535 A1    Feb. 14, 2008

(51) Int. Cl.
 *G06F 12/08* (2006.01)
(52) U.S. Cl. .................. 711/111; 711/112; 711/114
(58) Field of Classification Search .......... 711/100, 711/111, 112, 114, 203

See application file for complete search history.

(56) References Cited

U.S. PATENT DOCUMENTS 5,914,919 A    6/1999   Fosler et al.
6,513,101 B1 *  1/2003  Fisher et al. ............... 711/159

* cited by examiner

*Primary Examiner*—Jasmine Song
(74) *Attorney, Agent, or Firm*—Dale F. Regelman; Quarles & Brady LLP

(57) ABSTRACT

An apparatus and method are disclosed to manage one or more reserved volume serial numbers in a virtual library grid. The method supplies a virtual library grid comprising one or more virtual library clusters, wherein each of said one or more virtual library clusters comprises a management interface node, at least one virtualization node, at least one management node, at least one library manager node, at least one direct access storage device, one or more information storage media, and at least one data storage device to read information from and to write information to the one or more information storage media. The method then reserves in each of the one or more virtual library system clusters one or more volume serial numbers, and establishes a time out period. The method then determines if the time out period has expired. If the time out period has expired, the method unreserves in each of the one or more virtual library clusters the one or more volume serial numbers.

13 Claims, 6 Drawing Sheets

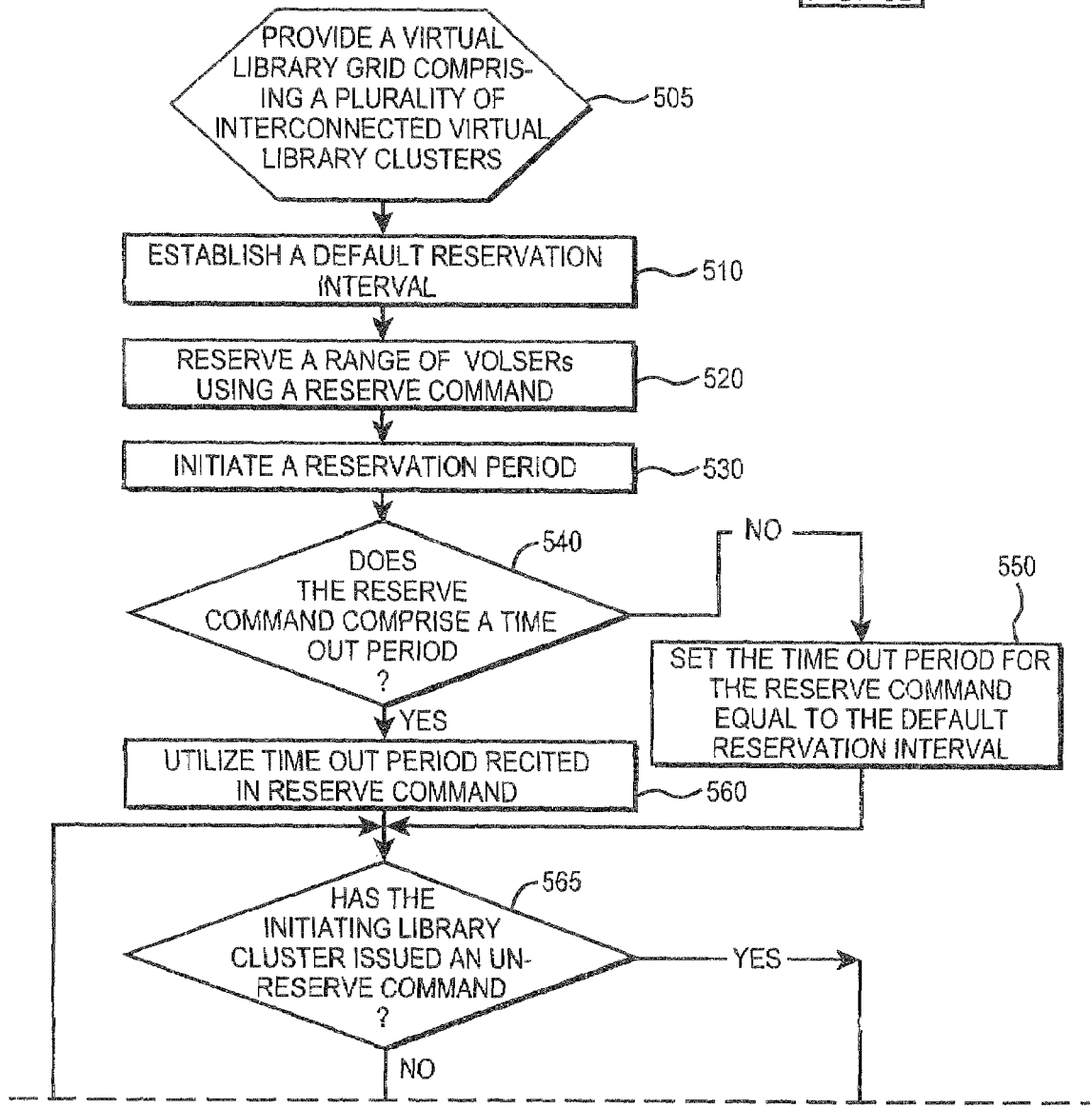

APPARATUS AND METHOD TO MANAGE ONE OR MORE RESERVED VOLUME SERIAL NUMBERS IN A VIRTUAL LIBRARY GRID

FIELD OF THE INVENTION

This invention relates to an apparatus and method to manage one or more reserved volume serial numbers in virtual library grid. In certain embodiments, the invention relates to an apparatus and method to manage one or more reserved volume serial numbers in a virtual tape server system grid.

BACKGROUND OF THE INVENTION

Virtual information storage systems present an image of one or more virtual data libraries. In that regard, virtual library systems present an image of one or more virtual media libraries containing a plurality of virtual volumes and virtual drives. A logical volume comprises information and metadata, wherein that logical volume comprises the entire image of a physical tape volume.

When using such virtual storage systems, logical volumes are combined and stored onto physical volumes, wherein those physical volumes are stored in a data library. Certain algorithms determine how long to retain logical volumes in a data cache, and when to write those logical volumes to physical media.

What is needed is a virtual library grid comprising two or more virtual libraries, wherein that virtual grid provides access to the logical volumes disposed in the grid if one of the virtual libraries fails. In addition, what is needed is a virtual library grid that is capable of communicating with host systems that use differing operating systems and/or differing communication protocols.

SUMMARY OF THE INVENTION

Applicants' invention comprises an apparatus and method to manage one or more reserved volume serial numbers in a virtual library grid. Applicants' method supplies a virtual library grid comprising one or more virtual library clusters, wherein each of the one or more virtual library clusters comprises a management interface node, at least one virtualization node, at least one management node, at least one library manager node, at least one direct access storage device, one or more information storage media, and at least one data storage device to read information from and to write information to the one or more information storage media. The method reserves in each of the one or more virtual library clusters one or more volume serial numbers.

The method then determines if the those one or more reserved volume serial numbers should be unreserved. If the method determines that the one or more reserved volume serial numbers should be unreserved, then the method unreserves those one or more volume serial numbers in each of the one or more virtual library clusters.

BRIEF DESCRIPTION OF THE DRAWINGS

The invention will be better understood from a reading of the following detailed description taken in conjunction with the drawings in which like reference designators are used to designate like elements, and in which:

FIG. 5A is a flow chart summarizing the steps of Applicants' method to manage one or more reserved volume serial numbers in Applicants' virtual library grid.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' virtual library cluster presents an image of one or more virtual information libraries, wherein each such virtual library comprises a plurality of virtual volumes and virtual information storage media and associated hardware. More specifically, Applicants' virtual library cluster virtualizes one or more data drives disposed in one or more libraries by presenting to a host computer an image of a volume via a file written to a direct access storage device ("DASD"). Logical volumes are combined and written to physical volumes (volume stacking), where those physical volumes are managed in one or more automated tape libraries. Applicants' virtual library cluster uses policy driven algorithms to balance the logical volumes held in the DASD and the logical volumes that only reside on physical media. Logical volumes are staged to and from physical tape volumes as required to service logical volume requests.

As a general matter, Applicants' virtual library cluster comprises two separate functionalities, namely a virtualization engine, in combination with storage management of a plurality of virtual volumes written to a plurality of physical media. Applicants' virtual library cluster isolates virtualization aspects, such as and without limitation, host connectivity and the devices being virtualized, from physical management of logical volumes and physical media. The visualization engine is embodied in a virtualization node function. The storage management function is embodied in a management node function.

Figure 1A:
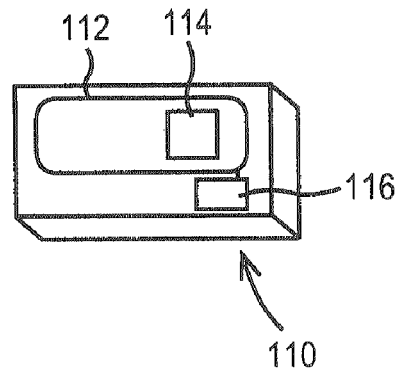
FIG. 1A is a block diagram illustrating Applicants' virtualization node.
Figure 2:
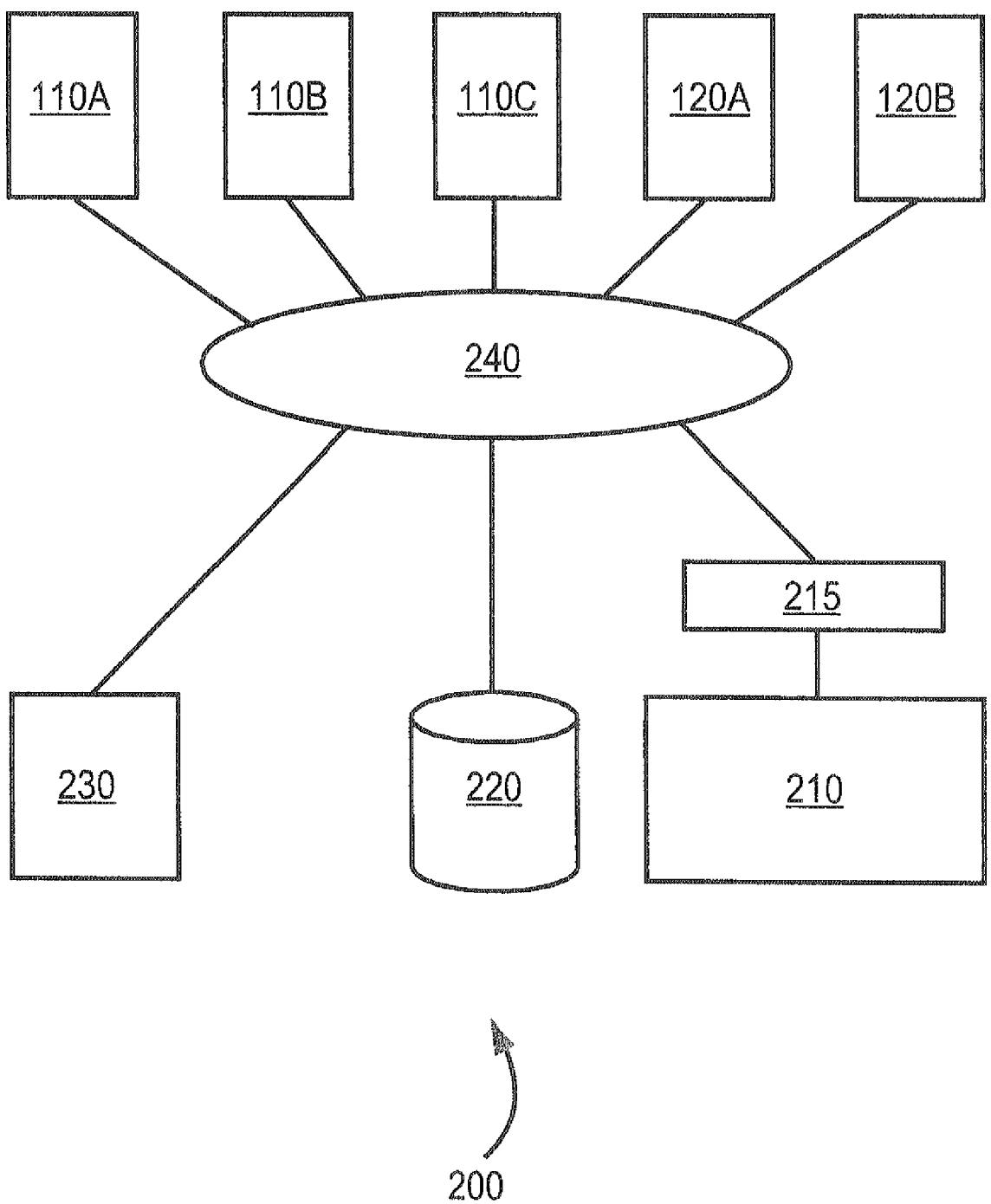
FIG. 2 is a block diagram illustrating one embodiment of Applicants' virtual library cluster.

Referring now to FIGS. 1A, and 2, virtualization node 110 presents the image of one or more virtual libraries to one or more host computers. As a general matter, such a host computer comprises a computing device such as a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

Virtualization node 110 handles tape drive and library requests from those one or more host computers, and processes those requests. Virtualization node 110 further translates host computer requests through a virtual drive, and accesses a file written to a file system disposed in DASD 220 (FIG. 2) to represent the virtual media image.

Virtualization node 110 comprises memory 112, instructions/microcode 114 written to memory 112, and controller 116 interconnected with memory 112. In certain embodiments, memory 112 and instructions/microcode 114 are disposed within controller 116. In certain embodiments, virtualization node 110 comprises an application specific integrated circuit ("ASIC"), wherein that ASIC comprises memory 112, instructions/microcode 114, and controller 116.

Controller 116 uses instructions/microcode 114 to operate virtualization node 110. In certain embodiments, virtualization node 110-MVS comprises processor 116 which uses instructions/microcode 114-MVS to communicate with host computers using an MVS zSeries operating system. In other embodiments, virtualization node 110-OPEN SYSTEM comprises controller 116 which uses instructions microcode 114-OPEN SYSTEM to communicate with host computers using an operating system other than MVS, such as and without limitation, Windows, AIX, Unix, LINUX, etc.

Figure 1B:
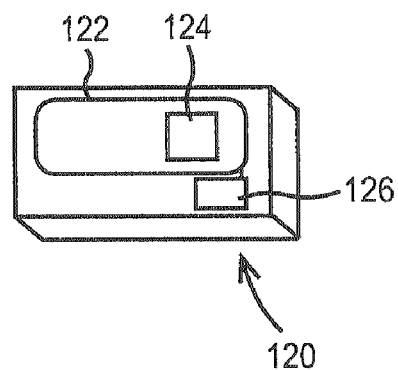
FIG. 1B is a block diagram illustrating Applicants' management node.

Referring now to FIG. 1B, management node 120 manages logical volume manipulation after those logical volumes are created or altered by a host computer. Management node 120 is aware of physical media resources, and the relationships between logical volumes and physical objects. In addition, management node 120 performs all replications of logical volumes, and attributes associated with those logical volumes, across virtual library cluster boundaries.

Management node 120 comprises memory 122, instructions/microcode 124 written to memory 122, and controller 126 interconnected with memory 122. Processor 126 uses instructions/microcode 124 to operate management node 120. In certain embodiments, memory 122 and instructions/microcode 124 are disposed within controller 126. In certain embodiments, management node 120 comprises an application specific integrated circuit ("ASIC") memory 122, instructions/microcode 124, and controller 126.

Figure 1C:
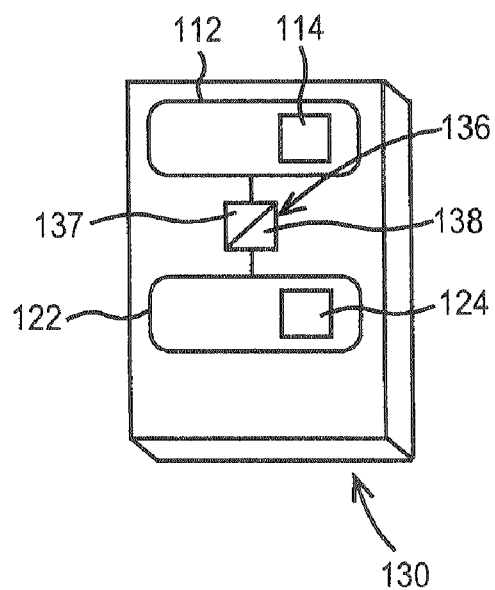
FIG. 1C is a block diagram illustrating Applicants' combined virtualization/management node.

Referring now to FIG. 1C, virtualization/management node 130 comprises virtualization node 110 functionality, i.e. memory 112 and instructions/microcode 114, in combination with management node 120 functionality, i.e. memory 122 and instructions/microcode 124, in combination with controller 136. In certain embodiments, virtualization node 110 functions operate using a first logical partition 137 of controller 136, and management node 120 functions operate using a second logical partition 138 of controller 136.

In the illustrated embodiment of FIG. 2, Applicants' virtual library cluster 200 comprises virtualization node 110A, virtualization node 110B, virtualization node 110C, management node 120A, management node 120B, media library 210, library manager node 215, direct access storage device ("DASD") 220, and management interface node 230.

As described hereinabove, in certain embodiments media library 210 comprises a plurality of hard disk drives. In certain embodiments, that plurality of hard disk drives utilize one or more RAID protocols. In still other embodiments, library 210 comprises a plurality of electronic storage media, such as and without limitation a plurality of devices such as PROMs, EPROMs, EEPROMs, Flash PROMs, compactflash, smartmedia, and the like.

In certain embodiments, media library 210 comprises one or more tape drives, a plurality of tape storage media disposed in a plurality of portable data storage cartridges, wherein that plurality of portable cartridges are stored in a plurality of storage slots. One or more robotic accessors retrieve, transport, and insert those portable data storage cartridges in the one or more tape drives. U.S. Pat. No. 5,914,919 teaches such an automated data storage library and is hereby incorporated herein by reference.

The elements of virtual library cluster 200 communicate with one another using communication protocol 240. Communication protocol 240 may comprise any type of I/O interface, such as and without limitation, inter-process communications, a backplane, a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In other embodiments, Applicants' virtual library cluster 200 comprises more than two management nodes. In other embodiments, Applicants' virtual library cluster 200 comprises as many as sixteen virtualization nodes. In other embodiments, Applicants' virtual library cluster 200 comprises more than sixteen virtualization nodes.

By "direct access storage device," Applicants means one or more data storage media in combination with drive hardware, wherein the each file written to the one or more data storage media can be accessed in about the same amount of time, as opposed to a sequential access protocol whereunder file location must necessarily progress sequentially through those one or more data storage media. In certain embodiments, DASD 220 comprises one or more magnetic disk storage media in combination with the appropriate drive hardware. In certain embodiments, DASD 220 comprises one or more RAID arrays. In certain embodiments, DASD 220 comprises one or more electronic storage media. By electronic storage media, Applicants mean a device such as a PROM, EPROM, EEPROM, Flash PROM, compactflash, smartmedia, and the like.

In certain embodiments, virtualization node 110A and/or 110B and/or 110C comprises a virtualization node 110-MVS. In certain embodiments, virtualization node 110A and/or 110B and/or 110C comprises a virtualization node 110—OPEN SYSTEM. The segmentation of functionality in virtual library cluster 200, namely the use of a plurality of separate virtualization nodes 110, allows virtual library cluster 200 to communicate transparently with differing host types using differing operating systems and/or differing communication protocols.

Applicants' virtual library grid comprises two or more of Applicants' virtual library clusters interconnected with one another. In the illustrated embodiment of FIG. 3, Applicants' virtual library grid 300 comprises four (4) interconnected virtual library clusters, namely virtual library cluster 200A, virtual library cluster 200B, virtual library cluster 200C, and virtual library cluster 200D. As a general matter, Applicants' virtual library grid comprises one or more virtual library clusters. In certain embodiments, Applicants' virtual library grid comprises more than four virtual library clusters.

Figure 3:
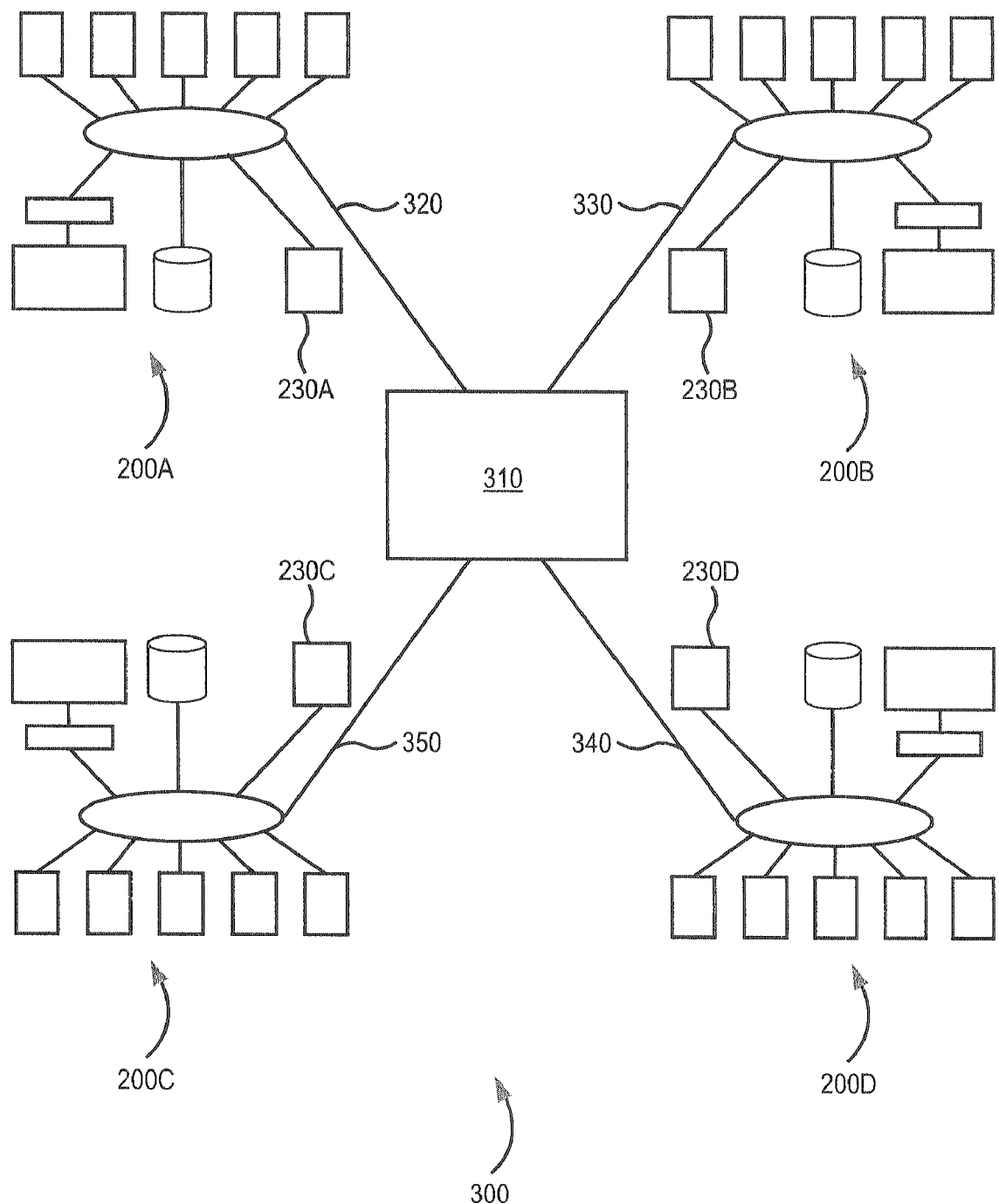
FIG. 3 is a block diagram illustrating one embodiment of Applicants' virtual library grid.

In the illustrated embodiment of FIG. 3, each of the four virtual library clusters is interconnected with grid manager 310. In certain embodiments, grid manager 310 comprises an operator panel. In certain embodiments, grid manager 310 comprises a computing device. In certain embodiments, grid manager 310 comprises a web browser.

In the illustrated embodiment of FIG. 3, virtual library cluster 200A is interconnected with grid manager 310 via communication protocol 320, virtual library cluster 200B is interconnected with grid manager 310 via communication protocol 330, virtual library cluster 200C is interconnected with grid manager 310 via communication protocol 350, and virtual library cluster 200D is interconnected with grid manager 310 via communication protocol 340. Communication protocols 320, 330, 340, and 350, may comprise any type of I/O interface, such as and without limitation, inter-process communications, a backplane, a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Applicants' virtual library grid 300 represents a single storage system to a host computer interconnected with any of Applicants' virtual library clusters disposed in Applicants' virtual library grid. In addition, Applicants' virtual library grid provides a form of disaster recovery. Logical volume attributes and data are replicated across the virtual library clusters comprising the virtual library grid to ensure that the interconnected host computers can retain access to the logical volumes disposed in the virtual library grid even if one of the virtual library clusters fails.

Figure 4:
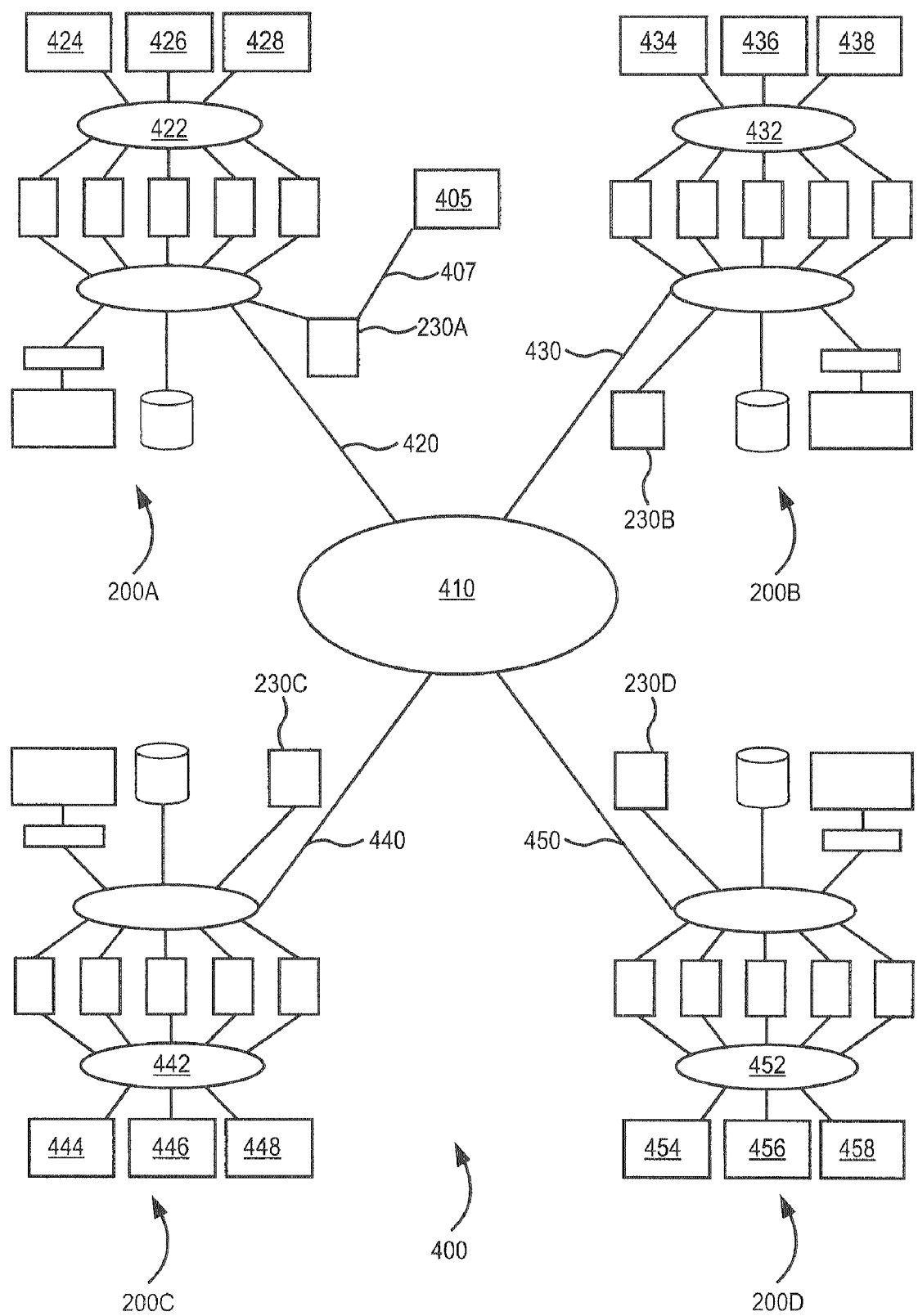
FIG. 4 is a block diagram illustrating a second embodiment of Applicants' virtual library grid.

In the illustrated embodiment of FIG. 4, Applicants' virtual library grid 400 comprises four (4) interconnected virtual library clusters, namely virtual library cluster 200A, virtual library cluster 200B, virtual library cluster 200C, and virtual library cluster 200D. As a general matter, Applicants' virtual library grid 400 comprises one or more virtual library clusters. In certain embodiments, Applicants' virtual library grid 400 comprises more than four virtual library clusters. In the illustrated embodiment of FIG. 4, management input device 405 communicates with management interface node 230A using communication protocol 407. In certain embodiments, management input device 405 comprises an operator panel. In certain embodiments, management input device 405 comprises a computing device. In certain embodiments, management input device 405 comprises a browser.

In certain embodiments, management input device 405 also communicates with one or more of management interfaces nodes 230B, 230C, and/or 230D. In yet other embodiments, a different management input device communicates with each management interface node 230A, 230B, 230C, and 230D.

In the illustrated embodiment of FIG. 4, each virtual library cluster configured in virtual library grid 400 is interconnected with a different set of three host computers. As a general matter, each virtual library cluster configured in Applicants' virtual library grid is interconnected with one or more host computers. In certain embodiments, each virtual library cluster configured in Applicants' virtual library grid is interconnected with one or more host computers, wherein each of those virtual library clusters may be interconnected with a different number of host computers. In yet other embodiments, each virtual library cluster configured in Applicants' virtual library grid is interconnected with the same one or more host computers. In still other embodiments, each virtual library cluster configured in Applicants' virtual library grid is interconnected with different set of one or more host computers.

In the illustrated embodiment of FIG. 4, host computers 424, 426, and 428, communicate with virtual library cluster 200A via communication protocol 422, host computers 434, 436, and 438, communicate with virtual library cluster 200B via communication protocol 432, host computers 444, 446, and 448, communicate with virtual library cluster 200C via communication protocol 442, and host computers 454, 456, and 458, communicate with virtual library cluster 200D via communication protocol 452.

Communication protocols 407, 422, 432, 442, and 452, may comprise any type of I/O interface, such as and without limitation, inter-process communications, a backplane, a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the illustrated embodiment of FIG. 4, virtual library cluster 200A communicates with virtual library grid 400 via communication link 420 and communication protocol 410, virtual library cluster 200B communicates with virtual library grid 400 via communication link 430 and communication protocol 410, virtual library cluster 200C communicates with virtual library grid 400 via communication link 440 and communication protocol 410, and virtual library cluster 200D communicates with virtual library grid 400 via communication link 450 and communication protocol 410. Communication protocol 410 in combination with communication links 420, 430, 440, and 450, may comprise any type of I/O interface, such as and without limitation, a backplane, inter-process communications, a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In order to add one or more logical volumes to Applicants' virtual library clusters interconnected in Applicants' virtual library grid, those logical volumes are first entered into one of the virtual library clusters comprising the virtual library grid. For example, in certain embodiments, management input device 405 (FIG. 4) is used to request the insertion of those one or more logical volumes into virtual library cluster 200A via management interface node 230A. Virtual library cluster 200A then inserts those logical volumes into the other virtual library clusters disposed in virtual library grid 400 via communication protocol/path 410.

Each such new logical volume is associated with a corresponding new volume serial number ("volser"). When adding one or more new logical volumes to Applicants' virtual library grid, the initiating virtual library cluster first determines if the insertion of one or more new volsers will be successful on all virtual library clusters comprising the virtual library grid before actually inserting the logical volumes.

In certain embodiments, the initiating virtual library cluster provides a "Reserve-A-Range" command to each virtual library cluster in the virtual library grid. Applicants' method to manage one or more reserved volume serial numbers also makes provision to "unreserve" one or more previously reserved volsers. Using Applicants' method, if one virtual library cluster in the virtual library grid rejects the "Reserve-A-Range" command, the initiating virtual library cluster can unreserve the one or more volsers recited in the reserve request.

Applicants' method to manage one or more reserved volume serial numbers further comprises a timeout period. If the reserved one or more volsers are not used within that timeout period, then those previously reserved volsers are unreserved, i.e. released for use by other users.

Figure 5B:
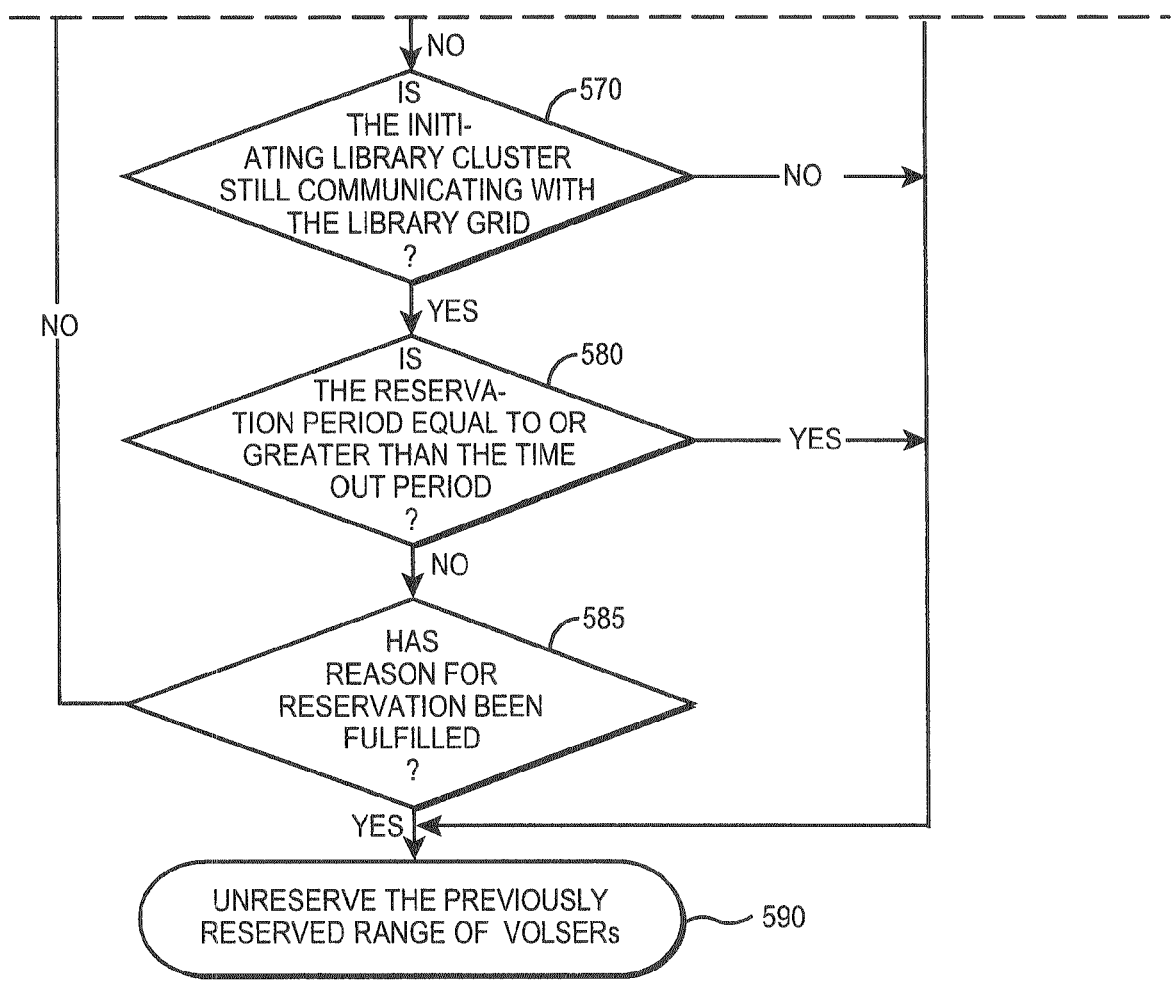
FIG. 5B is a flow chart summarizing additional steps of Applicants' method to manage one or more reserved volume serial numbers in Applicants' virtual library grid.

FIGS. 5A and 5B summarize the steps of Applicants' method to manage one or more reserved volume serial numbers in a virtual library grid. A data storage services provider may utilize the steps of Applicants' method to provide enhanced data storage services to one or more data storage services customers. In certain embodiments, the data storage services provider owns or leases a virtual library grid comprising one or more virtual library clusters. In certain embodiments, the data storage services provider also owns or leases one or more of the host computers in communication with that virtual library grid. In certain embodiments, one or more data storage services customers own or lease one or more host computers in communication with the virtual library grid.

Referring now to FIG. 5A, in step 505 Applicants' method provides a virtual library grid, such as virtual library grid 300 (FIG. 3) or virtual library grid 400 (FIG. 4), wherein that virtual library grid comprises one or more interconnected virtual library clusters, such as for example virtual library cluster 200A (FIGS. 2, 3, 4), virtual library cluster 200B (FIGS. 2, 3, 4), virtual library cluster 200C (FIGS. 2, 3, 4), and virtual library cluster 200D (FIGS. 2, 3, 4).

In step 510, Applicants' method establishes a default reservation interval. In certain embodiments, step 510 is performed by each virtual library cluster disposed in the virtual library grid of step 505. In certain embodiments, step 510 is performed by a library manager node disposed in each virtual library cluster disposed in the virtual library grid of step 505. In certain embodiments, step 510 is performed by a management node disposed in each virtual library cluster disposed in the virtual library grid of step 505.

In certain embodiments, the default reservation interval of step 510 is the same for each virtual library cluster disposed in the virtual library grid of step 505. In certain embodiments, the default reservation interval of step 510 differs for each virtual library cluster disposed in the virtual library grid of step 505.

In step 520, each virtual library cluster disposed in the virtual library grid of step 505 reserves a range of one or more volume serial numbers. In certain embodiments, step 520 is performed by a library manager node disposed in each virtual library cluster disposed in the virtual library grid of step 505. In certain embodiments, step 520 is performed by a management node disposed in each virtual library cluster disposed in the virtual library grid of step 505.

In certain embodiments, step 520 further comprises providing a reservation request from an initiating virtual library cluster disposed in the virtual library grid of step 505 to each of the other virtual library clusters, i.e. the receiving virtual library clusters. In certain embodiments, the reservation request of step 520 is made by a library manager node disposed in the initiating virtual library cluster. In certain embodiments, the reservation request of step 520 is made by a management node disposed in the initiating virtual library cluster.

In certain embodiments, the reservation request of step 520 comprises a time out period. During this time out period, other users are prevented from inserting volsers into the virtual library grid that fall within the reserved volser range.

Applicants' method transitions from step 520 to step 530 wherein each virtual library cluster in the virtual library grid of step 505 begins a reservation interval comprising a running time interval started upon reserving the one or more volume serial numbers, in step 520. In certain embodiments, step 530 is performed by a library manager node disposed in each virtual library cluster. In certain embodiments, step 530 is performed by a management node disposed in each virtual library cluster.

Applicants' method transitions from step 530 to step 540 wherein the method determines if the reserve command of step 520 comprises a time out period. In certain embodiments, step 540 is performed by a library manager node disposed in each virtual library cluster. In certain embodiments, step 540 is performed by a management node disposed in each virtual library cluster.

If Applicants' method determines in step 540 that the reservation request of step 520 does comprise a time out period, then the method transitions from step 540 to step 560 wherein the method utilizes the time out period recited in the reservation request of step 520. Applicants' method transitions from step 560 to step 565.

If Applicants' method determines in step 540 that the reservation request of step 520 does not comprise a time out period, then the method transitions from step 540 to step 550 wherein the method sets the time out period for the reservation request of step 520 tote default reservation interval of step 510. In certain embodiments, step 550 is performed by a library manager node disposed in each virtual library cluster. In certain embodiments, step 550 is performed by a management node disposed in each virtual library cluster.

Applicants' method transitions from step 550 to step 565 wherein the method determines if the initiating virtual library cluster has issued an unreserve command. In certain embodiments, step 565 is performed by a library manager node disposed in each virtual library cluster. In certain embodiments, step 565 is performed by a management node disposed in each virtual library cluster. If Applicants' method determines in step 565 that the initiating virtual library cluster has not issued an unreserve command, then the method transitions from step 565 to step 570 (FIG. 5B).

If Applicants' method determines in step 565 that the initiating virtual library cluster has issued an unreserve command, then the method transitions from step 565 to step 590 wherein each virtual library cluster unreserves the previously reserved one or more volsers thus making those volsers available for other users. In certain embodiments, step 590 is performed by a library manager node disposed in each virtual library cluster. In certain embodiments, step 590 is performed by a management node disposed in each virtual library cluster.

If Applicants method determines in step 565 that the initiating virtual library cluster has not issued an unreserve command, then the method transitions from step 565 to step 570 (FIG. 5B) wherein the method determines if the initiating virtual library cluster remains in communication with the virtual library grid of step 505. In certain embodiments, step 570 is performed by a library manager node disposed in each virtual library cluster. In certain embodiments step 570 is performed by a management node disposed in each virtual library cluster.

Referring now to FIG. 5B, if Applicants' method determines in step 570 that the initiating virtual library cluster is not in communication with the virtual library grid, then the initiating virtual library cluster may have failed, and therefore, be unable to insert logical volumes into the virtual library grid using the one or more reserved volsers. In addition, the initiating virtual library cluster may have unsuccessfully attempted to issue an unreserve command. Therefore, if Applicants' method determines in step 570 that the initiating virtual library cluster is not in communication with the virtual library grid, then the method transitions from step 570 to step 590 wherein each receiving virtual library cluster unreserves the previously reserved one or more volsers.

If Applicants' method determines in step 570 that the initiating virtual library cluster remains in communication with the virtual library grid, then the method transitions from step 570 to step 580 wherein the method determines if the reservation period started in step 530 is greater than or equal to the timeout period. In certain embodiments, step 580 is performed by a library manager node disposed in each virtual library cluster. In certain embodiments, step 580 is performed by a management node disposed in each virtual library cluster.

If Applicants' method determines in step 580 that the time out period has passed without one or more logical volumes being inserted under the reserved volsers, then the method transitions from step 580 to step 590 wherein the previously reserved one or more volsers are unreserved thus allowing other users to insert those volsers. Applicants' method thereby prevents a volser range from being reserved forever.

If Applicants' method determines in step 580 that the reservation period started in step 530 is not greater than or equal to the timeout period, then the method transitions from step 580 to 585 wherein the method determines if the one or more reasons for making the reservation request of step 520 have been fulfilled. If Applicants' method determines in the step 585 that the one or more reasons for making the reservation request of step 520 have been fulfilled, then the method transitions from step 585 to step 590. Alternatively, if Applicants' method determines in step 585 that the one or more reasons for making the reservation request of step 520 have not been fulfilled, then the method transitions from step 585 to step 565 and continues as described herein.

In certain embodiments, individual steps recited in FIGS. 5A and/or 5B may be combined, eliminated, or reordered.

In certain embodiments, Applicants' invention includes instructions/microcode, such as for example instructions/microcode 124 (FIGS. 1B, 1C) where those instructions/microcode are executed by a processor, such as processor 126 (FIG. 1B) and/or 136 (FIG. 1C), respectively, to perform one or more of steps 510, 520, 530, 540, 550, 560, 565, recited in FIG. 5A and/or 570, 580, 585, 590, recited in FIG. 5B.

In other embodiments, Applicants' invention includes instructions residing in any other computer program product, where those instructions are executed by a computer external to, or internal to, one or more of Applicants' virtual library clusters, to perform one or more of steps 510, 520, 530, 540, 550, 560, 565, recited in FIG. 5A and/or steps 570, 580, 585, 590, recited in FIG. 5B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to manage one or more reserved volume serial numbers in a virtual library grid, comprising the steps of:
    supplying a virtual library grid comprising one or more virtual library clusters, wherein each of said one or more virtual library clusters comprises a management interface node, at least one virtualization node, at least one management node, at least one library manager node, at least one direct access storage device, one or more information storage media, and at least one data storage device to read information from and to write information to said one or more information storage media;
    reserving in each of said one or more virtual library clusters one or more volume serial numbers;
    establishing a time out period;
    determining if said time out period has expired;
    if said time out period has expired, unreserving in each of said one or more virtual library clusters said one or more volume serial numbers
    providing by an initiating virtual library cluster to each of said one or more virtual library clusters a reservation request reciting said one or more volume serial numbers;
    wherein said establishing a time out period step further comprises:
    establishing a default reservation period;
    determining by each of said one or more virtual library clusters if said reservation request comprises a time out period;
    if said reservation request does not comprise a time out period, setting by each of said one or more virtual library clusters said time out period equal to said default reservation period.

2. The method of claim 1, wherein said determining step, and optionally said setting step, are performed by a management node disposed in each of said one or more virtual library clusters.

3. The method of claim 1, further comprising the steps of:
    determining by each of said one or more virtual library clusters if said initiating virtual library cluster has issued an unreserve command request reciting said one or more volume serial numbers;
    if said initiating virtual library cluster has issued an unreserve command request reciting said one or more volume serial numbers, unreserving said one or more volume serial numbers by each of said one or more virtual library clusters.

4. The method of claim 1, further comprising the steps of:
   determining by each of said one or more virtual library clusters if said initiating virtual library cluster remains in communication with said virtual library grid;
   if said initiating virtual library cluster is not in communication with said virtual library grid, unreserving by each of said virtual library clusters said one or more volume serial numbers.

5. A virtual library cluster comprising a computer readable medium having computer readable program code disposed therein to manage one or more reserved volume serial numbers, wherein said virtual library cluster comprises one of (N) interconnected virtual library clusters, wherein (N) is greater than or equal to 1, the computer readable program code comprising a series of computer readable program steps to effect:
   receiving a reservation request reciting one or more volume serial numbers;
   reserving said one or more volume serial numbers;
   determining if a pre-determined time out period has expired;
   if said time out period has expired, unreserving said one or more volume serial numbers;
   determining if said reservation request comprises a time out period;
   if said reservation request does not comprise a time out period, setting said time out period equal to a pre-determined default reservation period.

6. The virtual library cluster of claim 5, said computer readable program code further comprising a series of computer readable program steps to effect:
   determining if an unreserve command request reciting said one or more volume serial numbers has been received;
   if an unreserve command request reciting said one or more volume serial numbers has been received, unreserving said one or more volume serial numbers.

7. The virtual library cluster of claim 5, wherein said reservation request was provided by an initiating virtual library cluster, said computer readable program code further comprising a series of computer readable program steps to effect:
   determining if said initiating virtual library cluster remains in communication;
   if said initiating virtual library cluster is not in communication, unreserving said one or more volume serial numbers.

8. A computer program product encoded in an information storage medium disposed in one of (N) interconnected virtual library clusters, wherein (N) is greater than or equal to 1, and wherein said computer program product is usable with a programmable computer processor to manage one or more reserved volume serial numbers, comprising:
   computer readable program code which causes said programmable computer processor to receive a reservation request reciting one or more volume serial numbers;
   computer readable program code which causes said programmable computer processor to reserve said one or more volume serial numbers;
   computer readable program code which causes said programmable computer processor to determine if a pre-determined time out period has expired;
   computer readable program code which, if said time out period has expired, causes said programmable computer processor to unreserve said one or more volume serial numbers;
   computer readable program code which causes said programmable computer processor to determine if said reservation request comprises a time out period;
   computer readable program code which, if said reservation request does not comprise a time out period causes said programmable computer processor to set said time out period equal to a predetermined default reservation period.

9. The computer program product of claim 8, further comprising:
   computer readable program code which causes said programmable computer processor to determine if an unreserve command request reciting said one or more volume serial numbers has been received;
   computer readable program code which, if an unreserve command request reciting said one or more volume serial numbers has been received, causes said programmable computer processor to unreserve said one or more volume serial numbers.

10. The computer program product of claim 8, wherein said reservation request was provided by an initiating virtual library cluster, further comprising:
    computer readable program code which causes said programmable computer processor to determine if said initiating virtual library cluster remains in communication;
    computer readable program code which, if said initiating virtual library cluster is not in communication, causes said programmable computer processor to unreserving said one or more volume serial numbers by that receiving virtual library cluster.

11. A method to provide data storage services to one or more data storage services customers, comprising the steps of:
    supplying a virtual library grid comprising one or more virtual library clusters, wherein each of said one or more virtual library clusters comprises a management interface node, at least one virtualization node, at least one management node, at least one library manager node, at least one direct access storage device, one or more information storage media, and at least one data storage device to read information from and to write information to said one or more information storage media;
    providing a reservation request reciting one or more volume serial numbers by an initiating virtual library cluster to one or more receiving virtual library clusters;
    reserving in each of said one or more virtual library clusters one or more volume serial numbers;
    establishing a time out period;
    determining if said time out period has expired;
    if said time out period has expired, unreserving in each of said one or more virtual library clusters said one or more volume serial numbers;
    establishing a default reservation period;
    determining by each of said one or more virtual library clusters if said reservation request comprises a time out period;
    if said reservation request does not comprise a time out period, setting by each of said one or more virtual library clusters said time out period equal to said default reservation period.

12. The method of claim 11, further comprising the steps of:
    determining by each of said one or more virtual library clusters if an unreserve command request reciting said one or more volume serial numbers has been received;
    if an unreserve command request reciting said one or more volume serial numbers has been received, unreserving said one or more volume serial numbers by each of said one or more virtual library clusters.

13. The method of claim 11, further comprising the steps of:

determining by each of said one or more virtual library clusters if said initiating virtual library cluster remains in communication with said virtual library grid;

if said initiating virtual library cluster is not in communication with said virtual library grid, unreserving said one or more volume serial numbers by each of said one or more virtual library clusters.

\* \* \* \* \*